US007985457B2

(12) United States Patent
Steffl et al.

(10) Patent No.: US 7,985,457 B2
(45) Date of Patent: Jul. 26, 2011

(54) POLYOLEFIN TUBE

(75) Inventors: Udo Steffl, Weidenberg (DE); Volker Böhm, Sparneck (DE)

(73) Assignee: Rehau AG & Co., Rehau (DE)

( * ) Notice: Subject to any disclaimer, the term of this patent is extended or adjusted under 35 U.S.C. 154(b) by 1256 days.

(21) Appl. No.: 10/552,165

(22) PCT Filed: Jan. 23, 2004

(86) PCT No.: PCT/EP2004/000532
§ 371 (c)(1),
(2), (4) Date: Nov. 17, 2006

(87) PCT Pub. No.: WO2004/090032
PCT Pub. Date: Oct. 21, 2004

(65) Prior Publication Data
US 2007/0184227 A1    Aug. 9, 2007

(30) Foreign Application Priority Data
Apr. 11, 2003   (DE) .................... 103 16 845

(51) Int. Cl.
*B29C 47/00* (2006.01)
*F16L 11/04* (2006.01)
(52) U.S. Cl. ............ 428/36.9; 428/34.1; 428/35.7; 428/36.4; 428/36.8; 428/36.92
(58) Field of Classification Search .......... 428/34.1, 428/35.7, 36.4, 36.6, 36.7, 36.8, 36.9, 36.91, 428/36.92
See application file for complete search history.

(56) References Cited

U.S. PATENT DOCUMENTS

| 4,244,910 A | * | 1/1981 | Yui et al. ............ 264/328.12 |
| 4,514,539 A | | 4/1985 | Hattrich et al. |
| 5,374,685 A | | 12/1994 | Asanuma et al. |
| 5,420,208 A | | 5/1995 | Reid |
| 6,284,178 B1 | | 9/2001 | Russell et al. |
| 6,361,842 B1 | * | 3/2002 | Stachowiak ............ 428/35.7 |
| 6,894,101 B2 | * | 5/2005 | Paul et al. ............ 524/436 |

FOREIGN PATENT DOCUMENTS

| DE | 39 30 046 C2 | 3/1990 |
| GB | 1 526 398 | 9/1978 |

OTHER PUBLICATIONS

Voigt, H.U., "Über das Vernetzen von Polyolefin", Kautschuk—Gummi Kunststoffe 34, Jahrgang. Nr. Mar. 1981, pp. 197-206.

* cited by examiner

*Primary Examiner* — Walter B Aughenbaugh
(74) *Attorney, Agent, or Firm* — Venable LLP; Robert Kinberg; Keith G. Haddaway

(57) ABSTRACT

Silane cross-linked polyolefin tubes are used for drinking water and/or water for industrial use, are resistant to a chlorine content ranging from 0.1 to 5 ppm, have a minimum degree of cross-linking of 60%, are produced according to the single-stage process, and are comprised of the following polyolefin composition: (A) a polyolefin; (B) a mixture consisting of an organic silane of general formula RSiX3 (B1), of a radical-generating constituent (B2), and of a catalyst (B3); (C) a stabilizer mixture consisting of a high-molecular, phenolic constituent (C1) having a high melting point, of a sulfur-containing constituent (C2), of a phosphorous-containing processing stabilizer (C3), and of a metal deactivator (C4).

19 Claims, No Drawings

POLYOLEFIN TUBE

BACKGROUND OF THE INVENTION

The present invention relates to a silane cross-linked, chlorine-resistant polyolefin tube made by the so-called single-stage silane process.

Plastic tubular conduits are made from a large number of polymer materials.

In the field of materials for thermoplastic tubes particularly polyvinyl chloride, polypropylene, polyethylene, polybutylene or cross-linked polyolefin are utilized.

The cross-linking of polyolefins may be effected chemically or physically. As described, for example, in Kautschuk, Gummi, Kunststoff, 34th year, No. 3/1981, pages 197 ff, in the technically significant cross-linking technologies a distinction is made between radiation cross-linking, peroxide cross-linking and silane cross-linking.

The last-named process distinguishes itself from the other cross-linking methods primarily by the process technique: In a first process step the polymer chain radicals are generated with the aid of the usual radical initiators, to which, in a second process step, the silane molecules with their vinyl function are added. Such silane-grafted polymers may still be thermoplastically processed. The cross-linking proper takes places after shaping by a silane condensation reaction in the presence of heat and moisture. Such a so-called two-stage silane process is described in U.S. Pat. No. 3,646,155.

In contrast, British Patent No. 1,526,398 describes the so-called single-stage silane process. In this process all additives are simultaneously dosed with the polymer in a specially designed extruder for producing online the desired extruded material. Subsequently, cross-linking is effected in the presence of heat and moisture.

An application of a single-stage silane process, particularly for drinking-water tubes in the USA, is described in U.S. Pat. No. 6,284,178. In this process a residual methanol content of less than 12.2 ppm in the tube is obtained by using a maximum of 1.8 weight percent mixture of silane/peroxide/catalyst and by setting the duration of cross-linking at more than 4 hours. No mention is made concerning a chlorine-resistant provision of such a silane cross-linked polyethylene tube with special stabilizers. Rather, the combination of Irganox B215 and Irganox 1010 described in U.S. Pat. No. 6,284,178 has—because of the low melting point of the phenolic constituents—a much too low extraction resistance against chlorine water.

This prevents in practice the use of silane tubes made in accordance with U.S. Pat. No. 6,284,178.

The reason is that drinking water in the USA is provided, for purposes of disinfection, with a larger chlorine dose as compared to European conditions. As known by the specialist, at an appropriate pH-value, chlorine water may produce hypochlorous acid HOCl which is strongly oxidizing and therefore may lead to a premature failure of the tube.

It is the object of the invention to provide a silane cross-linked polyolefin tube which is made in a one-stage process and which is chlorine-resistant at a chlorine content between 0.1 and 5 ppm, which has minimum degree of cross-linking of 60%, and which further satisfies the standard specifications for cross-linked polyethylene tubes, set by the various ASTM and NSF norms.

SUMMARY OF THE INVENTION

The above object has been successfully achieved according to the invention by a tube having a polyolefin composition, comprising:

(A) a polyolefin,
(B) a mixture of an organic silane of the general formula $RSiX_3$ with a radical-generating constituent and a catalyst, and with
(C) a stabilizer mixture of a high-molecular phenolic constituent with a sulfur-containing constituent, a phosphorus-containing processing stabilizer and a metal deactivator.

It has been a main difficulty in solving the object of the invention that the added stabilizers and the radical-generating constituents mutually affect one another in the reactive extrusion process, and thus, after processing, negatively alter the terminal cross-linking degree and the residual stabilization in the tube. The level of residual stabilization, however, is decisive for a good chlorine resistance and is achieved only by a deliberate choice of the type and quantity of the individual constituents.

Furthermore, the possible extraction of the stabilizer package in chlorine water is critical. A suitable resistance to extraction may be achieved only if the phenolic constituent combines a large molecular weight with a high melting point and the sulfur-containing constituent, the phosphorus-containing processing stabilizer and the metal deactivator have large non-polar partial chains.

The degree of chrystallinity of the cross-linked tube is, not in the least, also an important magnitude; it is essential for the durability of its service life. This is so, because, as a rule, the degree of chrystallinity of the utilized polyethylene (PE) is reduced, for example, from 70% to, for example, 65% by the graft reaction and cross-linking, so that measures have to be taken to raise the degree of chrystallinity to the value appropriate for its application in question. This is achieved according to the invention by a tempering step at temperatures between 70-95° C. The duration required therefor depends from the PE utilized, how the reaction is run, and the specification to be obtained.

DETAILED DESCRIPTION

In the description that follows, the invention will be set forth in more detail.

The constituent (A) of the silane cross-linked polyolefin tube according to the invention is contained at 100 weight parts in the recipe and is either a low-pressure polyethylene (HDPE) made according to the Ziegler process or the Phillips process and having a degree of chrystallinity between 60 and 80% and a density of from 0.942 to 0.965 g/cm$^3$ or a polyethylene of medium density (MDPE; 0.930 to 0.942 g/cm$^3$).

The constituent (B) is a mixture of an organic silane of the general formula $RSiX_3$ (B1), a radical-generating constituent (B2) and a catalyst (B3). The organic silane $RSiX_3$ (B1) may be a vinyltrimethoxysilane, vinyltriethoxysilane or 3-(methacryloxy)propyltrimethoxysilane. The radical-generating constituent (B2) may be an alkylperoxide, acylperoxide, ketoneperoxide, hydroperoxide, peroxocarbonate, perester, peroxoketal, peroxooligomer or an azo compound. Particularly preferred are organic alkylperoxides having half-value times of 0.1 hour at temperatures>80° C., such as 2,5-dimethyl-2,5-di(tertiary-butylperoxy)hexane and/or 2,5-dimethyl-2,5-di(tertiary-butylperoxy)3-hexine and/or di(tertiarybutyl)peroxide and/or 1,3-di(tertiary-butyl-peroxyisopropyl)benzol and/or dicumylperoxide and/or tertiary-butylcumylperoxide. The catalyst (B3) may be dibutyltindilaurate, dibutyltinoxide, tinoctoate, dibutyltinmaleate or titanylacetonate. The weight part of the constituent (B), related to constituent (A), may be between 0.1 and 5 parts; particularly preferred are weight parts between 1 and 3.

Constituent (C) is a stabilizer mixture of a high-molecular phenolic constituent (C1) having a high melting point, a sulfur-containing constituent (C2), a phosphorus-containing processing stabilizer (C3) and a metal deactivator (C4).

The high-molecular phenolic stabilizer (C1) having a high melting point is selected from the group of 2,2'-methylene-bis(6-tertiary-butyl-4-methylphenol), 1,3,5-trimethyl-2,4,6-tris(3,5-di-tertiary-butyl-4-hydroxybenzyl)benzol, octadecyl 3-(3,5-di-tertiary-butyl-4-hydroxyphenyl)propionate, 1,1,3-tris(2-methyl-4-hydroxy-5-tertiary-butylphenyl)butane, tris (3,5-di-tertiary-butyl-4-hydroxybenzyl)isocyanurate, tris(4-tertiary-butyl-3-hdroxy-2,6-dimethylbenzyl)isocyanurate, pentaerythritol tetrakis(3,5-di-tertiary-butyl-4-hydroxyhydrocinnamate) or 1,3,5-tris(3,5-di-tertiary-butyl-4-hydroxybenzyl)triazine.

The sulfur-containing constituent (C2) may be a 5-tertiary-butyl-4-hydroxy-2-methylphenyl sulfide, 3-tertiary-butyl-2-hydroxy-5-methylphenyl sulfide, dioctadecyl-3,3'-thiodipropionate, dilauryl 3,3'-thiodipropionate or ditetradecyl-3,3'-thiodipropionate.

The phosphorus-containing processing stabilizer (C3) may be a tris(nonylphenyl)phosphite, tris(2,4-di-tertiary-butylphenyl)phosphite, tetrakis(2,4-di-tertiary-butylphenyl)-4,4'-biphenyldiphosphonite, 3,9-bis(octadecyloxy)-2,4,8,10-tetraoxa-3,9-diphosphaspiro[5.5]undecan or 3,9-bis(2,4-dicumylphenoxy)-2,4,8,10-tetraoxa-3,9-diphosphaspiro [5.5]undecan.

The metal deactivator (C4) is selected from the group of 1,2-bis(3,5-di-tertiary-butyl-4-hydroxyhydrocinnamoyl)hydrazide or 2,2'-oxalyldiamidobis-(ethyl-3-(3,5-di-tertiary-butyl-4-hydroxyphenyl)propinate) or oxalic bis(benzylidenehydrazide).

Very particularly preferred constituents (C) are 1,3,5-trimethyl-2,4,6-tris(3,5-di-tertiary-butyl-4-hydroxybenzyl)benzol (C1), dioctadecyl-3,3'-thiodipropionate (C2), tris(2,4-di-tertiary-butylphenyl)phosphite (C3) and 1,2-bis(3,5-di-tertiary-butyl-4-hydroxyhydrocinnamoyl)hydrazide (C4).

The weight part of the constituent (C) related to the constituent (A) may be between 0.1 and 5 parts.

To the chlorine-resistant tubes according to the invention there may be added up to 20 weight parts additives, related to constituent (A), in the form of up to 5 weight parts lubricant or processing agents, up to 5 weight parts nucleation agents, up to 5 weight parts antistatic agents, up to 10 weight parts process oils, up to 10 weight parts pigments, up to 5 weight parts expanding agents or up to 5 weight parts ultraviolet stabilizers.

By virtue of these particularities, the making of silane cross-linked, chlorine-resistant tubes according to the single-stage process is not obvious. Only the deliberate selection of the type and quantity of special stabilizers and the recipe adapted thereto as well as the process technique permit not only the manufacture of tubes having the usual property image, but also lead in a surprising manner to an advantageous property image, as set forth in the formulation of the object of the invention, particularly as concerns the resistance against a chlorine content between 0.1 and 5 ppm.

The chlorine-resistant, silane cross-linked polyolefin tubes are made according to the single-stage silane process, that is, the graft reaction of the silane of the constituent (B1) on the polyolefin of the constituent (A) and the shaping proceed simultaneously in one process step. Additionally to the monosil process described in the state of the art, a barrier screw is utilized for an effective distribution of the liquid constituents prior to the grafting step and for avoiding a preliminary cross-linking. A fusion pump may additionally also be utilized.

After processing, the tubes are cross-linked in a cross-linking chamber in a water vapor atmosphere at temperatures between 80 and 100° C. until a cross-linking degree of more than 60% is obtained. Thereafter occasionally a tempering step at 70-95° C. follows, until the desired, application-dependent degree of chrystallinity is obtained.

Tests on service life durability after a tempering step show, because of the increased degree of chrystallinity, an increased service life of the chlorine-resistant tubes according to the invention.

The application of the cross-linked tubes according to the invention is preferably in the field of tubes for drinking water and/or water for industrial use with and without a diffusion blocking layer.

The invention will be further explained by way of exemplary embodiments whose description follows.

The compositions are given in weight parts related to 100 weight parts of constituent (A) and are present in the Examples as follows:

| | Examples | | | |
|---|---|---|---|---|
| | Example 1 | Example 2 | Example 3 | Example 4 |
| polyethylene constituent (A) | 100 [1] | 100 [2] | 100 [2] | 100 [1] |
| constituent (B) | 2.30 [3] | 2.05 [3] | 2.10 [3] | 2.30 [3] |
| constituent (C) | 0.41 (C1) [4] | 0.49 (C1) [4] | 0.53 (C1) [4] | 0.41 (C1) [4] |
| | 0.10 (C2) [6] | 0.15 (C2) [6] | 0.16 (C2) [6] | 0.10 (C1) [5] |
| | 0.16 (C3) [8] | 0.19 (C3) [8] | 0.21 (C3) [8] | 0.10 (C2) [6] |
| | 0.10 (C4) [9] | 0.12 (C4) [9] | 0.13 (C4) [9] | 0.16 (C3) [8] |
| | | | | 0.10 (C4) [9] |

| | Example 5 | Example 6 | comparison example |
|---|---|---|---|
| polyethylene constituent (A) | 100 [1] | 100 [1] | 100 [2] |
| constituent (B) | 2.30 [3] | 2.30 [3] | 1.95 [3] |
| constituent (C) | 0.41 (C1) [4] | 0.41 (C1) [4] | [10] |
| | 0.10 (C2) [7[ | 0.10 (C2) [6] | |
| | 0.16 (C3) [8] | 0.10 (C4) [9] | |
| | 0.10 (C4) [9] | | |

Explanations [1] to [10] for constituents (A), (B), (C1) to (C4) for the Examples:

[1] polyethylene having a density [g/cm$^3$] of 0.952 and MFI [g/10 min] of 5-7 (190° C./2.16 kg)

[2] polyethylene having a density [g/cm$^3$] of 0.944 and MFI [g/10 min] of 4 (190° C./2.16 kg)

[3] silane/peroxide/catalyst mixture: viscosity [mPasec]=2.5 (at 23° C.); density [g/cm$^3$]=0.969, colorless liquid

[4]     1,3,5-trimethyl-2,4,6-tris(3,5-di-tertiary-butyl-4-hydroxybenzyl)benzol; molecular weight [g/mol]=775

[5] pentaerythritol tetrakis(3,5-di-tertiary-butyl-4-hydroxyhydrocinnamat); molecular weight [g/mol]=1178

[6] dioctadecyl-3,3'-thiodipropionate; molecular weight [g/mol]=683

[7]     3-tertiary-butyl-2-hydroxy-5-methylphenyl sulfide; molecular weight [g/mol]=358.5

[8] tris(2,4-di-tertiary-butylphenyl)phosphite; molecular weight [g/mol]=647
[9] 1,2-bis(3,5-di-tertiary-butyl-4-hydroxyhydrocinnamoyl) hydrazide; molecular weight [g/mol]=552
[10] stabilizer-MB: Vibatan PEX Antiox 02012, added quantity 5 parts.

EXAMPLES 1-6

In a single-screw extruder which is provided with a barrier screw and a metering device and which is intended for the liquid silane/peroxide/catalyst mixture, the polyolefin (A) and the stabilizer mixture (C) are dosed by means of a metering scale. The mixture is melted and the liquid silane/peroxide/catalyst mixture (B) is dosed in and shaped to form a tube.

The requirements concerning a chlorine-resistant drinking-water tube in the USA are listed in the NSF Protocol P171 (1999 edition). A combination of a "Differential Scanning Calometry" (DSC) experiment with a modified test for service life durability has been found suitable for a practical determination of the chlorine resistance.

With the DSC experiment, oxidation reactions of synthetic materials may be generally determined. The OIT (oxidizing induction time) represents a process with which information may be obtained concerning the stability of polyolefin tubes against oxidizing attacks. In the static process (ASTM norm D3895) utilized here, the specimen is heated to a temperature of 210° C. in an inert atmosphere. The temperature is maintained. After equilibrium sets in, the scavenging gas is switched from an inert atmosphere to an oxidizing atmosphere. The exothermal oxidizing reaction then starts after a certain delay. By means of the DSC experiments fine nuances in the critical residual stabilizer content may be detected in the chlorine-resistant, silane cross-linked polyolefin tubes of the invention.

Further, a modified test for service life durability has been performed as a pre-test. In this test the tube sections having a length greater than 30 cm are exposed under pressure to chlorinated tap water at a PH-value of 7 and submitted to a test of service life durability at temperatures of 20° C., 95° C. and 110° C. and subjected to different pressures p [Nmm-2]. Every 8 days the tube sections are taken out and examined concerning the chlorine concentration and PH-value.

The table below shows the properties of the tubes according to the invention.

|  | Example 1 | Example 2 | Example 3 | Example 4 |
|---|---|---|---|---|
| mean cross-linking degree in [%] according to ASTM F876-01 | 71.2 | 72.6 | 74.6 | 70.6 |
| OIT 210° C. [min] | 73.3 | 105.7 | 119.3 | 91.0 |
| service life at 95° C. in hours p = 4.65-4.71*) with chlorine water | >1660 | >1660 | >1660 | >1660 |
| service life at 110° C. in hours p = 2.75-2.81*) with chlorine water | >380 | >380 | >380 | >380 |
| service life at 20° C. in hours p = 12.0-12.5*) with chlorine water | >290 | 17.5 | 12.95 | >290 |

|  | Example 5 | Example 6 | comparative example |
|---|---|---|---|
| mean cross-linking degree in [%] according to ASTM F876-01 | 66.7 | 68.8 | 65.5 |
| OIT 210° C. [min] | 80.0 | 74.4 | 41.9 |
| service life at 95° C. in hours p = 4.65-4.77*) with chlorine water | >1660 | >1660 | 0.52 |
| service life at 110° C. in hours p = 2.75-2.84*) with chlorine water | >380 | >380 | >380 |
| service life at 20° C. in hours p = 12.0-12.5*) with chlorine water | >290 | 290.3 | 5.33 |

*p means the pressure range in $Nmm^{-2}$

What is claimed is:

1. Silane cross-linked polyolefin tubes comprising a polyolefin composition prepared by a single stage process that comprises:
   (A) a polyolefin,
   (B) a mixture of an organic silane of the general formula $RSiX_3$ (B1), a radical-generating constituent (B2) and a catalyst (B3), and
   (C) a stabilizer mixture comprised of a phenolic constituent (C1), a sulfur-containing constituent (C2), a phosphorus-containing processing stabilizer (C3) and a metal deactivator (C4);
   wherein the tubes are resistant to chlorine in water at a chlorine content between 0.1 and 5 ppm, and the composition has a minimum cross-linking degree of 60%.

2. The silane cross-linked polyolefin tubes as defined in claim 1, wherein constituent (A) is selected from the group consisting of low-pressure polyethylenes having a degree of chrystallinity between 60 and 80% and a density from 0.942 to 0.965 g/cm³ and a polyethylene having a mean density of 0.930 to 0.942 g/cm³.

3. The silane cross-linked polyolefin tubes as defined in claim 1, wherein the organic silane of the general formula $RSiX_3$ (B1) is selected from the group consisting of vinyltrimethoxysilane, vinyltriethoxysilane and 3-(methacryloxy) propyltrimethoxysilane.

4. The silane cross-linked polyolefin tubes as defined in claim 1, wherein the radical-generating constituent (B2) is selected from the group consisting of alkylperoxide, acylperoxide, ketoneperoxide, hydroperoxide, peroxocarbonate, perester, peroxoketal, and peroxooligomers.

5. The silane cross-linked polyolefin tubes as defined in claim 1, wherein the radical-generating constituent (B2) is an azo compound.

6. The silane cross-linked polyolefin tubes as defined in claim 1, wherein radical-generating constituent (B2) is an organic alkylperoxide having a half-value time of 0.1 hour at temperatures >80° C.

7. The silane cross-linked polyolefin tubes as defined in claim 6, wherein the organic alkylperoxide is selected from the group consisting of 2,5-dimethyl-2,5-di(tertiary-butylperoxy)hexane, 2,5-dimethyl-2,5-di(tertiary-butylperoxy)-3-hexine, di(tertiarybutyl)peroxide, 1,3-di(tertiary-butyl-peroxyisopropyl)benzol, dicumylperoxide, tertiary-butylcumylperoxide, and combinations thereof.

8. The silane cross-linked polyolefin tubes as defined in claim 1, wherein the catalyst (B3) of the constituent (B) is selected from the group consisting of dibutyltindilaurate, dibutyltinoxide, tin octoate, dibutyltinmaleate and titanylacetonate.

9. The silane cross-linked polyolefin tubes as defined in claim 1, wherein the phenolic constituent (C1) is selected from the group consisting of 2,2'-methylenebis(6-tertiary-butyl-4-methylphenol), 1,3,5-trimethyl-2,4,6-tris(3,5-di-tertiary-butyl-4-hydroxybenzyl)benzol, octadecyl-3-(3,5-di-tertiary-butyl-4-hydroxyphenyl)propionate, 1,1,3-tris(2-methyl-4-hydroxy-5-tertiary-butylphenyl)butane, tris(3,5-di-tertiary-butyl-4-hydroxybenzyl)isocyanurate, tris(4-tertiary-butyl-3-hydroxy-2,6-dimethylbenzyl)isocyanurate, pentaerythritoltetrakis(3,5-di-tertiary-butyl-4-hydroxyhydrocinnamate) or and 1,3,5-tris(3,5-di-tertiary-butyl-4-hydroxybenzyl)triazine.

10. The silane cross-linked polyolefin tubes as defined in claim 1, wherein the sulfur-containing constituent (C2) is selected from the group consisting of 5-tertiary-butyl-4-hydroxy-2-methylphenylsulfide, 3-tertiary-butyl-2-hydroxy-5-methylphenylsulfide, dioctadecyl-3,3'-thiodipropionate, dilauryl-3,3'-thiodipropionate and ditetradecyl-3,3'-thiodipropionate.

11. The silane cross-linked polyolefin tubes as defined in claim 1, wherein the phosphorus-containing processing stabilizer (C3) is selected from the group consisting of tris(nonylphenyl)phosphite, tris(2,4-di-tertiary-butylphenyl)phosphite, tetrakis(2,4-di-tertiary-butylphenyl)-4,4'-biphenyldiphosphonite, 3,9-bis(octadecyloxy)-2,4,8,10-tetraoxa-3,9-diphosphaspiro[5.5]undecan and 3,9-bis(2,4-dicumylphenoxy)-2,4,8,10-tetraoxa-3,9-dipho sphaspiro[5.5]undecan.

12. The silane cross-linked polyolefin tubes as defined in claim 1, wherein the metal deactivator (C4) is selected from the group consisting of 1,2-bis(3,5-di-tertiary-butyl-4-hydroxyhydrocinnamoyl)hydrazide, or 2,2'-oxalyldiamidobis-(ethyl-3-(3,5-di-tertiary-butyl-4-hydroxyphenyl)propionate) and oxalic bis(benzylidenehydrazide).

13. The silane cross-linked polyolefin tubes as defined in claim 1, wherein the weight part of constituent (B) for 100 weight parts of constituent (A) is between 0.1 and 5 parts, particularly between 1 and 3 parts.

14. The silane cross-linked polyolefin tubes as defined in claim 1, wherein the weight part of constituent (C) for 100 weight parts of constituent (A) is between 0.1 and 5 parts.

15. The silane cross-linked polyolefin tubes as defined in claim 1, further comprising up to 20 weight parts of additives for 100 weight parts of constituent (A), wherein the additive is selected from up to 5 weight parts of lubricating or processing agents, up to 5 weight parts of nucleation agents, up to 5 weight parts of antistatic agents, up to 10 weight parts of processing oils, up to 10 weight parts of pigments, up to 5 weight parts of expanding agents and up to 5 weight parts of ultraviolet stabilizers.

16. The silane cross-linked polyolefin tubes as defined in one of the preceding claims, wherein the tube has a cross-linking degree in the range of 60 to 89%.

17. Tubes for drinking water and/or water for industrial use, said tubes comprising the silane cross-linked tubes of claim 1.

18. The silane cross-linked polyolefin tubes as defined in claim 1, wherein the weight part of constituent (B), for 100 weight parts of constituent (A), is between 1 and 3 parts.

19. The silane cross-linked polyolefin tubes as defined in one of claims 2-15, 17 or 18, wherein the tube has a cross-linking degree in the range of between 65 and 75%.

* * * * *